United States Patent Office 3,131,215
Patented Apr. 28, 1964

3,131,215
2-HALO- AND 2,4-DIHALO-ALKYLPHENYL
CARBAMATES
Alan J. Lemin, Richland Township, Kalamazoo County,
Mich., assignor to The Upjohn Company, Kalamazoo,
Mich., a corporation of Delaware
No Drawing. Filed Oct. 6, 1960, Ser. No. 60,769
13 Claims. (Cl. 260—479)

This invention pertains to new chemical compounds, to a process of preparing them, and to insecticidal compositions and process. More particularly, the invention is directed to novel 2-halo- and 2,4-dihalo-alkylphenyl carbamates, to a process of preparing them, and to their use for preventing and arresting infestations of insect pests.

Human welfare has been repeatedly assaulted and frequently lacerated by the ravages of insect pests en masse. Locusts, army worms, pine sawflies, ticks, fleas, grasshoppers, cinch bugs, and other insects, seemingly ad infinitum, plague almost every economic pursuit of man, serve as vectors for transmission of disease, and many of them cause personal discomfort. Agricultural pursuits are particularly susceptible to damage from insect attacks, and in recent years many potent insecticides have been introduced which protect crops and livestock from insect damage. However, the see-saw battle has not been won because new varieties of insect pests emerge on the scene, the older forms develop resistance to the once deadly agents, and complications due to warm-blooded animal toxicities prevent completely effective eradication programs. The resistance of houseflies to DDT [1,1,1-trichloro-2,2-bis(p-chlorophenyl)ethane] is well-known. Similarly, the citrus red mite (*Paratetranychus citri*) appears to be developing resistance to parathion, one of the most effective agents known against this widespread and serious insect pest. Although parathion is widely used for the control of insect pests such as red mites it is highly toxic to warm-blooded animals, and therefore, rigorous precautions during application and against crop residues must be exercised.

It is an object of this invention to provide novel chemical compounds, and novel processes for preparing the same. Another object is to provide novel means for the control of insects. A further object is to provide insecticidal agents that are relatively nontoxic to warm-blooded animals. Still other objects of the invention will become apparent to persons skilled in the art as the following description proceeds.

It has now been found, in accordance with the invention, that certain novel 2-halo- and 2,4-dihalo-alkylphenyl carbamates are active against insect pests. They are as potent as parathion in the control of citrus red mites, but they are much less toxic. The compounds are, therefore, particularly notable acaricides since they provide advantages over parathion and are more active than other commercially available acaricides. The compounds are also active in low concentrations against flies, mosquitoes, thrips, bean beetles, aphids, army worms, salt marsh caterpillars and other lepidopterous larvae. As used herein, the term "insect" is used in the same sense as in the Federal Insecticide, Fungicide, and Rodenticide Act of 1947 and refers generally to animals comprising the phylum Arthropoda, illustratively, class Insecta, for example, orders Isoptera, Thysanoptera, Mallophaga, Hemiptera, Anoplura, Homoptera, Coleoptera, Lepidoptera, Orthoptera, Diptera, and Hymenoptera; and class Arachnida, for example, orders Araneae and Acarina.

The novel compounds of the invention are represented by the following structural formula:

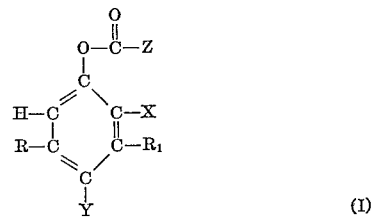

(I)

wherein Z contains a total of not more than 10 carbon atoms and is selected from the group consisting of monoalkylamino, monoalkenylamino, dialkylamino, dialkenylamino, and a saturated heterocyclic amino radical

of from 5 to 9 nuclear atoms, inclusive, wherein Z' represents a saturated bivalent radical selected from the group consisting of alkylene, oxadialkylene, and thiadialkylene; X is halogen; R is alkyl of from 1 to 4 carbon atoms, inclusive; $R_1$ is selected from the group consisting of hydrogen and alkyl of from 1 to 4 carbon atoms, inclusive; and Y is selected from the group consisting of halogen and alkyl of from 1 to 4 carbon atoms, inclusive.

Representative alkyl groups within the scope of the present invention include, e.g., methyl, ethyl, propyl, butyl, amyl, hexyl, heptyl, octyl, nonyl, decyl, and isomeric forms thereof. Representative alkenyl groups include, e.g., allyl, methallyl, crotyl, hexenyl, octenyl, decenyl, and the like. Representative halogens include, e.g., chlorine, bromine, iodine, and fluorine. Representative saturated heterocyclic amino radicals include, e.g., pyrrolidino, piperidino, morpholino, thiamorpholino, hexamethyleneimino, heptamethyleneimino, octamethyleneimino, homomorpholino, 2-methylhexamethyleneimino, 3,6-dimethylhexamethyleneimino, 2-ethylmorpholino, 2-ethyl-5-methylmorpholino, 3,3-dimethylmorpholino, 3-methylthiamorpholino, 2,3,5,6-tetramethylthiamorpholino, 2,3,6-trimethylthiamorpholino, 2-methylpiperidino, 3-methylpiperidino, 4-methylpiperidino, 2-butylpiperidino, 2-propylpiperidino, 4-isopropylpiperidino, 3,4-diethylpiperidino, 2-sec.-butylpyrrolidino, 2,2-dimethylpyrrolidino, 2-ethylpyrrolidino, 3,4-dimethylpyrrolidino, 2-isopropylpyrrolidino, and the like.

Compounds of Formula I, above, wherein Z is monoalkylamino or monoalkenylamino, are readily prepared by condensing a 2-halo- or 2,4-dihalo-alkylphenol having the following structural formula:

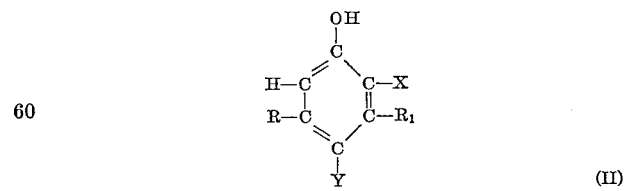

(II)

wherein X, R, $R_1$, and Y are as defined above, with an alkyl or alkenyl isocyanate, for example, methyl, ethyl, propyl, allyl, isopropyl, butyl, tertiary butyl, amyl, hexyl, heptyl, octyl, and decyl isocyanate, in the presence of an inert organic solvent, for example, diethyl ether, diisopropyl ether, dioxane, and the like. The reactants are preferably mixed in equimolar proportions, but, if desired, an excess of either reactant can be used. The reaction proceeds readily at temperatures between about 15° C. and about 100° C. Illustratively, the methyl-, ethyl-, and propylcarbamates are readily obtained by allowing the reaction mixture to stand overnight at about 25° C. The product is recovered by conventional methods such as filtration or concentration of the reaction mixture followed by filtration, washing, recrystallization, distillation, etc.

The compounds of Formula I are also prepared by reacting a 2-halo- or 2,4-dihalo-alkylphenol (Formula II), preferably in the form of an alkali metal salt, e.g., sodium or potassium salt, with phosgene to form the corresponding 2-halo- or 2,4-dihalo-alkylphenyl chloroformate, and then reacting the 2-halo- or 2,4-dihalo-alkylphenyl chloroformate with a monoalkylamine, dialkylamine, monoalkenylamine, dialkenylamine, or compound of the formula

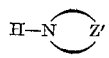

wherein Z' is as defined above. The 2-halo- or 2,4-dihalo-alkylphenyl chloroformate is prepared by mixing a water solution of the 2-halo- or 2,4-dihalo-alkylphenol containing a base, for example sodium hydroxide or potassium hydroxide, and a solution of phosgene in an inert organic solvent, for example, toluene, benzene, diethyl ether, and the like. This reaction is exothermic and is advantageously carried out at temperatures between about −30° C. and about +30° C. The phosgene:organic solvent solution is added slowly and with mixing in order to prevent localized heating or undesirable temperatures above about 30° C. The 2-halo- or 2,4-dihalo-alkylphenyl chloroformate, thus formed, accumulates in the organic phase, and the aqueous phase is separated. The chloroformate intermediate can then be isolated and purified by recrystallization or distillation, or it can be used without further purification in the preparation of the carbamates of the invention.

The reaction of an amine of the kind noted above, and the 2-halo- or 2,4-dihalo-alkylphenyl chloroformate is carried out in the presence of a solvent, for example, water, diethyl ether, and dioxane. The reaction is advantageously carried out at temperatures in the range of about 10° C. to about 50° C. The rate of reaction is slow at temperatures below about 10° C.; and at temperatures above about 50° C., low boiling amines volatilize and decomposition of the chloroformate intermediate or carbamate product can occur. Stoichiometrically, the reaction requires one mole of amine for each mole of chloroformate. However, the reaction produces one mole of hydrogen chloride, so an excess of the amine, preferably at least one mole excess, or another suitable acid acceptor, for example, triethylamine, pyridine, picoline, sodium hydroxide, and the like should be employed. The 2-halo- or 2,4-dihalo-alkylphenyl carbamate product is recovered by conventional methods, for example, filtering off any solids, removing the solvent, washing, and recrystallizing from a suitable solvent.

Alternatively, the compounds of Formula I can be prepared by reacting a carbamyl halide, for example hexylcarbamyl chloride, with a phenol having Formula II above.

The following examples are illustrative of the process and active compounds of the present invention, but they are not to be construed as limiting.

EXAMPLE 1.—PREPARATION OF 2,4-DICHLORO-3-METHYL-5-ETHYLPHENYL METHYLCARBAMATE

To a solution consisting of 20.51 g. (0.1 mole) of 2,4-dichloro-3-methyl-5-ethylphenol, 1 drop of triethylamine, and 50 ml. of diisopropyl ether was added 5.7 g. (0.1 mole) of methyl isocyanate. A crystalline precipitate that collected while the reaction mixture was held at about 25° C. for 18 hrs. was separated by filtration and washed with technical hexane (essentially a mixture of methyl-substituted pentanes and n-hexane having a boiling range of 140° to 160° F.). After recrystallization from technical hexane the 2,4-dichloro-3-methyl-5-ethylphenyl methyl-carbamate had a melting point of 118.5° to 119.5° C.

Analysis.—Calc'd. for $C_{11}H_{13}Cl_2NO_2$: C, 50.45; H, 5.0; N, 5.35; Cl, 27.05. Found: C, 50.4; H, 5.0; N, 5.3; Cl, 27.15.

Following the same procedure but substituting 2,4-dibromo-3-methyl-5-ethylphenol, 2,4-dichloro-3,5-diethylphenol, 2,4-dichloro-3,5-dipropylphenol, 2,4-dichloro-3,5-dibutylphenol, 2,4-dichloro-3-ethyl-5-butylphenol, and 2,4-dichloro-3-methyl-5-isopropylphenol for 2,4-dichloro-3-methyl-5-ethylphenol, the corresponding 2,4-dibromo-3-methyl-5-ethylphenyl, 2,4-dichloro-3,5-diethylphenyl, 2,4-dichloro-3,5-dipropylphenyl, 2,4-dichloro - 3,5 - dibutylphenyl, 2,4-dichloro-3-ethyl-5-butylphenyl, and 2,4-dichloro-3-methyl-5-isopropylphenyl methylcarbamates are prepared.

EXAMPLE 2.—PREPARATION OF 2-CHLORO-4,5-DIMETHYLPHENYL ETHYLCARBAMATE

To a solution of 15.66 g. (0.1 mole) of 2-chloro-4,5-dimethylphenol in 150 ml. of anhydrous diethyl ether was added 7.11 g. (0.1 mole) of ethyl isocyanate. After the reaction mixture had been held at about 25° C. for about 16 hrs., 10 ml. of technical hexane was added. A fine white precipitate formed. The precipitate was recovered on a filter, and the filter cake was washed with technical hexane. After drying in a vacuum oven, the 2-chloro-4,5-dimethylphenyl ethylcarbamate thus obtained had a melting point of 96° to 97° C.

Analysis.—Calc'd. for $C_{11}H_{14}ClNO_2$: C, 57.52; H, 6.14; N, 6.10; Cl, 16.31. Found: C, 57.68; H, 5.88; N, 6.34; Cl, 15.64.

Following the same procedure but substituting 2-chloro-4-ethyl-5-methylphenol, 2-chloro-4,5-diethylphenol, 2-chloro-4,5-dipropylphenol, 2-chloro-4,5-dibutylphenol, 2-chloro-4-ethyl-5-isopropylphenol, 2-chloro-3,4,5-trimethylphenol, 2-chloro-3-ethyl-4,5-dimethylphenol, 2-chloro-3-ethyl-4-propyl-5-butylphenol, and 2-chloro-3,4,5-tributylphenol for 2-chloro-4,5-dimethylphenol, the corresponding 2-chloro-4-ethyl-5-methylphenyl, 2-chloro-4,5-diethylphenyl, 2-chloro-4,5-dipropylphenyl, 2-chloro-4,5-dibutylphenyl, 2-chloro-4-ethyl - 5 - isopropylphenyl, 2-chloro-3,4,5-trimethylphenyl, 2 - chloro - 3 - ethyl-4,5-dimethylphenyl, 2-chloro-3-ethyl-4-propyl - 5 - butylphenyl, and 2-chloro-3,4,5-tributylphenyl ethylcarbamates are prepared.

EXAMPLE 3.—PREPARATION OF 2,4-DICHLORO-3-METHYL - 5 - ETHYLPHENYL ETHYLCARBAMATE

To a solution of 20.51 g. (0.1 mole) of 2,4-dichloro-3-methyl-5-ethylphenol in 150 ml. of anhydrous diethyl ether was added 7.11 g. (0.1 mole) of ethyl isocyanate. After holding the reaction mixture at about 25° C. for about 18 hrs., 10 ml. of technical hexane was added. The mixture was concentrated by heating on a steam bath in order to remove the ether. The yellow liquid thus obtained was cooled and a fine white precipitate appeared. After precipitation was complete, the mixture was filtered. The filter cake was washed with technical hexane, and the 2,4-dichloro-3-methyl-5-ethylphenyl ethylcarbamate thus obtained had a melting point of 91° C. after drying in a vacuum oven.

*Analysis.*—Calc'd. for $C_{12}H_{15}Cl_2NO_2$: N, 5.07; Cl, 25.68. Found: N, 5.16; Cl, 25.74.

EXAMPLE 4.—PREPARATION OF 2,4-DICHLORO-3,5-DIMETHYLPHENYL ETHYLCARBAMATE

To a solution of 19.21 g. (0.1 mole) of 2,4-dichloro-3,5-dimethylphenol in 150 ml. of anhydrous diethyl ether was added 7.11 g. (0.1 mole) of ethyl isocyanate. After holding the reaction mixture at about 25° C. for about 18 hrs., it was concentrated by evaporating the ether on a steam bath. Ten ml. of technical hexane was added to the concentrated reaction mixture, and the mixture was cooled in the refrigerator for about 15 min. The fine, white crystals of 2,4-dichloro-3,5-dimethylphenyl ethylcarbamate thus produced were recovered on a filter, washed with technical hexane, and dried in a vacuum oven, M.P. 120° to 124° C.

*Analysis.*—Calc'd. for $C_{11}H_{13}Cl_2NO_2$: C, 50.45; H, 5.0; N, 5.35; Cl, 27.05. Found: C, 50.12; H, 4.89; N, 5.46; Cl, 27.46.

In the manner described, but substituting isopropyl isocyanate, butyl isocyanate, isobutyl isocyanate, amyl isocyanate, isoamyl isocyanate, hexyl isocyanate, heptyl isocyanate, octyl isocyanate, and decyl isocyanate for ethyl isocyanate, the corresponding 2,4-dichloro-3,5-dimethylphenyl isopropyl-,
2,4-dichloro-3,5-dimethylphenyl butyl-,
2,4-dichloro-3,5-dimethylphenyl isobutyl-,
2,4-dichloro-3,5-dimethylphenyl amyl-,
2,4-dichloro-3,5-dimethylphenyl isoamyl-,
2,4-dichloro-3,5-dimethylphenyl hexyl-,
2,4-dichloro-3,5-dimethylphenyl heptyl-,
2,4-dichloro-3,5-dimethylphenyl octyl-, and
2,4-dichloro-3,5-dimethylphenyl decylcarbamates are prepared.

EXAMPLE 5.—PREPARATION OF 2,4-DICHLORO-5-METHYLPHENYL METHYLCARBAMATE

Following the procedure of Example 1 but substituting 2,4-dichloro-5-methylphenol for 2,4-dichloro-3-methyl-5-ethylphenol, the corresponding 2,4-dichloro-5-methylphenyl methylcarbamate having a melting point of 128° to 131° C. was prepared.

*Analysis.*—Calc'd. for $C_9H_9Cl_2NO_2$: N, 6.0; Cl, 30.3. Found: N, 6.2; Cl, 29.9.

EXAMPLE 6.—PREPARATION OF 2-CHLORO-4,5-DIMETHYLPHENYL METHYLCARBAMATE

Following the procedure of Example 1 but substituting 2-chloro-4,5-dimethylphenol for 2,4-dichloro-3-methyl-5-ethylphenol, the corresponding 2-chloro-4,5-dimethylphenyl methylcarbamate having a melting point of 122° to 124° C. was prepared.

*Analysis.*—Calc'd. for $C_{10}H_{12}ClNO_2$: C, 56.2; H, 5.62; N, 6.6; Cl, 16.6. Found: C, 56.3; H, 5.6; N, 6.6; Cl, 16.45.

Following the same procedure but substituting 2-bromo-4,5-dimethylphenol, 2-iodo-4,5-dimethylphenol, and 2-fluoro-4,5-dimethylphenol for 2-chloro-4,5-dimethylphenol, the corresponding 2-bromo-4,5-dimethylphenyl, 2-iodo-4,5-dimethylphenyl, and 2-fluoro-4,5-dimethylphenyl methylcarbamates are prepared.

EXAMPLE 7.—PREPARATION OF 2,4-DICHLORO-3,5-DIMETHYLPHENYL METHYLCARBAMATE

Following the procedure of Example 1 but substituting 2,4-dichloro-3,5-dimethylphenol for 2,4-dichloro-3-methyl-5-ethylphenol, the corresponding 2,4-dichloro-3,5-dimethylphenyl methylcarbamate having a melting point of 134° to 136° C. was prepared.

*Analysis.*—Calc'd. for $C_{10}H_{11}Cl_2NO_2$: C, 48.4; H, 4.5; N, 5.6; Cl, 28.6. Found: C, 48.3; H, 4.6; N, 5.15; Cl, 28.2.

EXAMPLE 8.—PREPARATION OF 2-CHLORO-4,5-DIMETHYLPHENYL DIMETHYLCARBAMATE

*Part A.—Preparation of 2-Chloro-4,5-Dimethylphenyl Chloroformate*

A quantity (61.6 g., 0.39 mole) of 2-chloro-4,5-dimethylphenol and 15.76 g. (0.39 mole) of sodium hydroxide were mixed and stirred in 150 ml. of water until a clear solution was obtained. To this solution was added a solution of 39 g. (0.39 mole) of phosgene in 120 ml. of toluene, prepared by bubbling phosgene into toluene at −10° C. The phosgene:toluene solution was added slowly with mechanical stirring in order to keep the temperature at about 25° C. The reaction mixture was stirred for 1.5 hrs. and filtered to remove solids. The aqueous layer was separated from the organic layer in a separatory funnel and the organic layer was washed with 200 ml. portions of 5% aqueous potassium hydroxide solution. The toluene solution was washed with water until neutral and it was dried over anhydrous sodium sulfate. The toluene was removed by distillation and on cooling there was obtained 59 g. of 2-chloro-4,5-dimethylphenyl chloroformate.

*Part B.—Preparation of 2-Chloro-4,5-Dimethylphenyl Dimethylcarbamate*

To a solution of 19.1 g. (0.09 mole) of 2-chloro-4,5-dimethylphenyl chloroformate in 200 ml. of anhydrous diethyl ether was added 8.1 g. (0.18 mole) of dimethylamine dissolved in 100 ml. of diethyl ether. The reaction flask was agitated during the addition and the reaction mixture became warm. A precipitate began to collect and the mixture was held for about 18 hrs. at about 25° C. and filtered. The filtrate was concentrated by evaporation to a yellow liquid which was distilled at 0.01 mm. of mercury pressure. 2-chloro-4,5-dimethylphenyl dimethylcarbamate was obtained as a fraction distilling at 122° C. It had a refractive index $n_D^{27}$ of 1.5318.

*Analysis.*—Calc'd. for $C_{11}H_{14}ClNO_2$: C, 57.52; H, 6.14; N, 6.10; Cl, 16.31. Found: C, 57.9; H, 5.9; N, 6.0; Cl, 16.2.

EXAMPLE 9.—PREPARATION OF 2-CHLORO-4,5-DIMETHYLPHENYL PROPYLCARBAMATE

Following the procedure of Example 8, Part B, but substituting propylamine for dimethylamine, there was obtained 2-chloro-4,5-dimethylphenyl propylcarbamate having a melting point of 61° to 63° C.

*Analysis.*—Calc'd. for $C_{12}H_{16}ClNO_2$: C, 59.20; H, 6.63; N, 5.76; Cl, 15.39. Found: C, 59.45; H, 6.61; N, 5.73; Cl, 14.74.

EXAMPLE 10.—PREPARATION OF 2-CHLORO-4,5-DIMETHYLPHENYL ISOPROPYLCARBAMATE

Following the procedure of Example 8, Part B, but substituting isopropylamine for dimethylamine, there was obtained 2-chloro-4,5-dimethylphenyl isopropylcarbamate having a melting point of 103° to 104° C.

*Analysis.*—Calc'd. for $C_{12}H_{16}ClNO_2$: N, 5.76. Found: N, 5.95.

EXAMPLE 11.—PREPARATION OF 2-CHLORO-4,5-DIMETHYLPHENYL BUTYLCARBAMATE

Following the procedure of Example 8, Part B, but substituting butylamine for dimethylamine, there was obtained 2-chloro-4,5-dimethylphenyl butylcarbamate having a melting point of 60° to 61° C.

*Analysis.*—Calc'd. for $C_{13}H_{18}ClNO_2$: N, 5.48; Cl, 13.87. Found: N, 5.37; Cl, 14.12.

EXAMPLE 12.—PREPARATION OF 2-CHLORO-4,5-DIMETHYLPHENYL ISOBUTYLCARBAMATE

Following the procedure of Example 8, Part B, but substituting isobutylamine for dimethylamine, there was obtained 2-chloro-4,5-dimethylphenyl isobutylcarbamate having a melting point of 82° to 83° C.

*Analysis.*—Calc'd. for $C_{13}H_{18}ClNO_2$: C, 61.05; H, 7.09; N, 5.48; Cl, 13.87. Found: C, 60.88; H, 6.58; N, 5.38; Cl, 13.68.

EXAMPLE 13.—PREPARATION OF 2-CHLORO-4,5-DIMETHYLPHENYL DIETHYLCARBAMATE

Following the procedure of Example 8, Part B, but substituting diethylamine for dimethylamine, there was obtained 2-chloro-4,5-dimethylphenyl diethylcarbamate having a boiling point of 109° to 116° C. at 0.01 mm. of mercury pressure.

*Analysis.*—Calc'd. for $C_{13}H_{18}ClNO_2$: C, 61.05; H 7.09; N, 5.48; Cl, 13.87. Found: C, 61.48; H, 7.15; N, 5.19; Cl, 13.84.

EXAMPLE 14.—PREPARATION OF 2-CHLORO-4,5-DIMETHYLPHENYL DIPROPYLCARBAMATE

Following the procedure of Example 8, Part B, but substituting dipropylamine for dimethylamine, there was obtained 2-chloro-4,5-dimethylphenyl dipropylcarbamate having a boiling point of 118° to 127° C. at 0.01 mm. of mercury pressure.

*Analysis.*—Calc'd. for $C_{15}H_{22}ClNO_2$: N, 4.94; Cl, 12.49. Found: N, 4.8; Cl, 12.53.

EXAMPLE 15.—PREPARATION OF 2-CHLORO-4,5-DIMETHYLPHENYL DIBUTYLCARBAMATE

Following the procedure of Example 8, Part B, but substituting dibutylamine for dimethylamine, there was obtained 2-chloro-4,5-dimethylphenyl dibutylcarbamate having a boiling point of 131° to 138° C. at 0.01 mm. of mercury pressure.

*Analysis.*—Calc'd. for $C_{17}H_{26}ClNO_2$: C, 65.47; H, 8.40; N, 4.49; Cl, 11.37. Found: C, 65.73; H, 8.23; N, 4.38; Cl, 11.56.

EXAMPLE 16.—PREPARATION OF 2-CHLORO-4,5-DIMETHYLPHENYL DIAMYLCARBAMATE

Following the procedure of Example 8, Part B, but substituting diamylamine for dimethylamine, there was obtained 2-chloro-4,5-dimethylphenyl diamylcarbamate having a boiling point of 162° to 168° C. at 0.01 mm. of mercury pressure.

*Analysis.*—Calc'd. for $C_{19}H_{30}ClNO_2$: C, 67.13; H, 8.90; N, 4.12; Cl, 10.43. Found: C, 67.10; H, 8.92; N, 4.10; Cl, 10.32.

EXAMPLE 17.—PREPARATION OF 2-CHLORO-4,5-DIMETHYLPHENYL ALLYLCARBAMATE

Following the procedure of Example 8, Part B, but substituting allylamine for dimethylamine, there was obtained 2-chloro-4,5-dimethylphenyl allylcarbamate having a melting point of 100° to 101° C.

*Analysis.*—Calc'd. for $C_{12}H_{14}ClNO_2$: C, 60.13; H, 5.89; Cl, 14.79. Found: C, 60.10; H, 5.94; Cl, 14.50.

EXAMPLE 18.—PREPARATION OF 2-CHLORO-4,5-DIMETHYLPHENYL DIALLYLCARBAMATE

Following the procedure of Example 8, Part B, but substituting diallylamine for dimethylamine, there was obtained 2-chloro-4,5-dimethylphenyl diallylcarbamate having a boiling point of 131° to 140° C. at 0.01 mm. of mercury pressure.

*Analysis.*—Calc'd. for $C_{15}H_{18}ClNO_2$: C, 64.45; H, 6.44; N, 5.0; Cl, 12.7. Found: C, 64.28; H, 6.39; N, 4.96; Cl, 12.61.

In the manner described, but substituting methallylamine, crotylamine, decenylamine, and di(methallyl)-amine for diallylamine, the corresponding 2-chloro-4,5-dimethylphenyl methallyl-, crotyl-, decenyl-, and di-(methyllyl)carbamates are prepared.

EXAMPLE 19.—PREPARATION OF 2-CHLORO-4,5-DIMETHYLPHENYL (3-OXOPENTAMETHYLENE)CARBAMATE

Following the procedure of Example 8, Part B, but substituting morpholine for dimethylamine, there was obtained 2-chloro-4,5-dimethylphenyl (3-oxopentamethylene)carbamate having a melting point of 102° to 103° C.

*Analysis.*—Calc'd. for $C_{13}H_{16}ClNO_3$: C, 57.88; H, 5.98; N, 5.19; Cl, 13.15. Found: C, 57.85; H, 5.99; N, 5.05; Cl, 12.66.

In the manner described, but substituting pyrrolidine,
piperidine,
thiamorpholine,
hexamethyleneimine,
heptamethyleneimine,
octamethyleneimine,
homomorpholine,
2-methylhexamethyleneimine,
3,6-dimethylhexamethyleneimine,
2-ethylmorpholine,
2-ethyl-5-methylmorpholine,
3,3-dimethylmorpholine,
3-methylthiamorpholine,
2,3,5,6-tetramethylthiamorpholine,
2,3,6-trimethylthiamorpholine,
2-methylpiperidine,
3-methylpiperidine,
4-methylpiperidine,
2-butylpiperidine,
2-propylpiperidine,
4-isopropylpiperidine,
3,4-diethylpiperidine,
2-sec.-butylpyrrolidine,
2,2-dimethylpyrrolidine,
2-ethylpyrrolidine,
3,4-dimethylpyrrolidine, and 2-isopropylpyrrolidine for morpholine, the corresponding 2-chloro-4,5-dimethylphenyl tetramethylene-,
pentamethylene-,
(3-thiapentamethylene)-,
hexamethylene-,
heptamethylene-,
octamethylene-,
(3-oxahexamethylene)-,
(1-methylhexamethylene)-,
2,5-dimethylhexamethylene)-,
(2-ethyl-3-oxapentamethylene)-,
(1-methyl-4-ethyl-3-oxapentamethylene)-,
(1,1-dimethyl-3-oxapentamethylene)-,
(1-methyl-3-thiapentamethylene)-,
(1,2,4,5-tetramethyl-3-thiapentamethylene)-,
(1,2,4-trimethyl-3-thiapentamethylene)-,
(1-methylpentamethylene)-,
(2-methylpentamethylene)-,
(3-methylpentamethylene)-,
(1-butylpentamethylene)-,
(1-propylpentamethylene)-,
(3-isopropylpentamethylene)-,
(2,3-diethylpentamethylene)-,
(1-sec.-butyltetramethylene)-,
(1,1-dimethyltetramethylene)-,
(1-ethyltetramethylene)-,
(2,3-dimethyltetramethylene)-,
and (1-isopropyltetramethylene)-
carbamates are prepared.

EXAMPLE 20.—PREPARATION OF 2,4-DICHLORO-3-ETHYL-5-METHYLPHENOL METHYLCARBAMATE

Following the procedure of Example 1, but substituting 2,4-dichloro-3-ethyl-5-methylphenol for 2,4-dichloro-3-methyl-5-ethylphenol, there was obtained 2,4-dichloro-3-ethyl-5-methylphenyl methylcarbamate having a melting point of 136° to 138° C.

*Analysis.*—Calc'd for $C_{11}H_{13}Cl_2NO_2$: C, 50.45; H, 5.0; N, 5.35; Cl, 27.05. Found: C, 50.37; H, 4.87; N, 5.4; Cl 27.15.

The insecticidally active 2-halo- and 2,4-dihalo-alkylphenyl carbamates of this invention can be used in their pure state, but for practical reasons it is preferred that they be used as insecticidal compositions. Such compositions comprise a 2-halo- or 2,4-dihalo-alkylphenyl carbamate and a diluent carrier, preferably a dispersible insecticide carrier of the kind commonly used in the art, with or without adjuvants.

For example, insecticidal compositions useful against insects which infest plants can be formulated as dusts, wettable powders, emulsifiable concentrates, aqueous dispersions, solutions, and the like for application to foliage, seeds, or other parts of plants. Compositions suitable for root or bole infusion can be made. Moreover, the active agents of the invention can be used alone in the compositions, or they can be used in combination with other insecticidal, fungicidal, virucidal, or bactericidal agents.

It is usually desirable, particularly in the case of foliar spray formulations, to include adjuvants such as wetting agents, spreading agents, dispersing agents, stickers and adhesives, and the like, in accordance with usual agricultural practices. Any of the conventional wetting and dispersing agents of the anionic, cationic, and nonionic types that are commonly employed in compositions for application to plants can be used. Surfactants having sufficient wetting activity and therefore being suitable for the compositions of this invention include alkyl sulfates and sulfonates, alkyl arylsulfonates, sulfosuccinate esters, polyoxyethylene sulfates, polyoxyethylene-sorbitan monolaurate, alkyl aryl polyether sulfates, alkyl aryl polyether alcohols, alkyl quaternary ammonium salts, sulfated fatty acid esters, sulfated fatty acid amides, glycerol mannitan laurate, polyalkylether condensates of fatty acids, lignin sulfonates, and the like. It will be understood, of course, that the sulfate and sulfonate compounds suggested above will preferably be used in the form of their soluble salts, e.g., sodium salts. All of these surfactants are capable of reducing the surface tension of water to less than about 40 dynes per centimeter in concentrations of about 1% or less.

The insecticidal dusts of the invention comprise a 2-halo- or 2,4-dihalo-alkylphenyl carbamate dispersed in an inert dusting powder such as pyrophyllite, diatomite, clays such as bentonite, Georgia clay, Attapulgus clay, Barden clay, wood or walnut shell flour, and the like. Dusting powder is understood to be a solid material comminuted so that it has an average particle size of less than 50 microns, advantageously, less than 15 microns. The amount of 2-halo- or 2,4-dihalo-alkylphenyl carbamate formulated in a dusting powder composition is advantageously about 2% to about 80%, by weight, preferably about 5% to 25%, by weight. Illustratively, a dusting powder is obtained by mixing approximately equal parts of the active ingredient and pyrophyllite, comminuting either before or after the admixture as desired. A wettable powder suitable for dispersing in an aqueous vehicle is obtained by including a surfactant with a dusting powder. Suitable surfactants include sodium lauryl sulfate, sodium and calcium ligno-sulfonates, 1-tetradecyl-4-methylpyridinium chloride, Triton X-100 (isooctylphenoxy polyethoxy ethanol), and Pluronic F-68 (ethylene oxide-propylene glycol condensate, nonionic surfactant). If desired the surfactant can be incorporated in the dry mixture either by dry milling or by adding it in solution in a volatile solvent such as ethanol or acetone, mixing to form a paste, drying, and milling.

For convenience in handling, the active compounds of the invention can be prepared with or without adjuvants in the form of concentrated solutions in a solvent, for example, toluene, xylene, acetone, benzene, ethyl acetate, dimethylformamide, dimethylacetamide, dimethyl sulfoxide, acetonitrile, cyclohexanone, or similar solvent. Such concentrates can be dispersed in a suitable volume of an aqueous medium in the presence of a surfactant such as those disclosed above to give a mixture of any desired concentration. The surfactant can be included in the concentrated solution of the active ingredient to give an emulsifiable concentrate, or it can be added separately when the aqueous dispersion is being prepared. For the most part, mixtures containing very low concentrations of the active ingredient are effective. Illustratively, the concentration of the 2-halo- or 2,4-dihalo-alkylphenyl carbamate can range from about 25 to about 5000 p.p.m., depending upon the amount of active material applied per acre. For example, excellent control of red mites on citrus trees, both protective and eradicative, has been obtained using concentrations of active ingredient ranging from about 25 to 2000 p.p.m. without damage to the plants. For example, an emulsifiable concentrate comprising 5% (by weight) of the compound can be admixed with an aqueous medium in the proportions of one teaspoonful (about 5 cc.) of concentrate with one gallon of medium to give a mixture containing 60 to 75 parts of active ingredient per million parts of water. Similarly, one pint of a 5% concentrate mixed with 100 gals. of water provides about 60 p.p.m. of active ingredient. In the same manner, more concentrated solutions of active ingredient in a solvent can be incorporated with an appropriate quantity of an aqueous medium or petroleum base insecticide carrier, e.g., summer oil, kerosene, and the like vehicles, to give a dispersible mixture of desired concentration.

A suitable wettable powder formulation is obtained by blending and milling 327 lbs. of Georgia clay, 4.5 lbs. of Triton X-100 as a wetting agent, 9 lbs. of a polymerized sodium salt of a substituted benzoic long-chain sulfonic acid (Daxad 27) as a dispersing agent, and 113 lbs. of the active ingredient. The resulting formulation has the following percentage composition (parts herein are by weight unless otherwise specified):

|  | Percent |
| --- | --- |
| Active ingredient | 25 |
| Triton X-100 | 1 |
| Daxad 27 | 2 |
| Georgia clay | 72 |

This formulation, when dispersed in water at one pound per 100 gals., gives a spray formulation containing about 0.03% (300 p.p.m.) active ingredient.

A suitable emulsifiable concentrate is obtained by admixing the following materials:

|  | Parts |
| --- | --- |
| Active ingredient | 15 |
| Xylene | 81.5 |
| Dodecylbenzene sodium monosulfonate | 1.75 |
| Condensation product of one mole of octylphenol and about 12 moles of ethylene oxide | 1.75 |

The mixture of dodecylbenzene sodium monosulfonate and condensation product is added to the xylene, and the active ingredient is then added. This formulation, when dispersed in water at one pint per 100 gals., gives a spray formulation containing about 0.02% (200 p.p.m.) active ingredient.

The active compounds of the invention can also be formulated in relatively dilute proportions in a dispersible insecticide carried for household applications. Thus, the active compounds can be formulated in dusts having from about 0.1% to 5.0% active ingredient with a dusting powder as hereinbefore described, and in solutions containing from about 0.01% to about 5.0% active ingredient with deodorized kerosene for aerosol applications.

It will of course be appreciated that the conditions encountered when applying the method and compositions of this invention to actual practice can vary widely. Included among the variables that may be encountered are the degree of infestation by insects, the particular insect to be controlled, the particular plant being treated, the degree of development of the plant, the prevailing weather conditions, such as temperature, relative humidity, rainfall, dews, and so forth.

Representative compounds of this invention have been tested at various concentrations against adult red mites and mosquito larvae according to the procedure described in volume I of "Methods of Testing Chemicals on Insects," edited by H. H. Shepherd, pp. 92–113, Burgess Publishing Co., Minneapolis. Table I shows percentage kill of the test organisms caused by varying concentrations of representative compounds of the invention.

TABLE I

| Compound | Adult Red Mites Concentration (percent by weight) | | | Mosquito Larval Concentration (percent by weight) | | |
|---|---|---|---|---|---|---|
| | 1.0 | 0.1 | 0.01 | 0.01 | 0.001 | 0.0001 |
| 2,4-dichloro-3-methyl-5-ethyl-phenyl methylcarbamate | 99 | 100 | 95 | 100 | 100 | 75 |
| 2-chloro-4,5-dimethylphenyl methylcarbamate | 100 | 99 | 48 | 100 | 95 | 100 |
| 2,4-dichloro-3,5-dimethyl-phenyl methylcarbamate | 100 | 90 | 21 | 100 | 100 | 100 |
| 2,4-dichloro-5-methylphenyl methylcarbamate | 100 | 93 | 4 | 100 | 100 | 40 |

From these data it is readily apparent that the compounds of the invention possess excellent activity against the test organisms, and that they can be used in the control of insect pests.

Further in accordance with this invention, it has been found that the insecticidal activity of 2-halo- and 2,4-dihalo-alkylphenyl carbamates is significantly enhanced when compounded with piperonyl butoxide, sesamex (Sesoxane), propyl isome, sulfoxide, sesame oil extractives, and octachlorodipropyl ether. See Kenaga, Bull. Entomol. Soc. Amer. 6, 55, 1960. Illustratively, the activity of a 0.1% solution of 2,4-dichloro-3-methyl-5-ethylphenyl methylcarbamate against houseflies was increased 100% by 1 part of the compound with 5 parts of piperonyl butoxide. The piperonyl butoxide alone showed no activity under the same conditions. The synergistic combinations can be formulated as aqueous emulsions, as dry or wettable powders, as solutions to be applied as aerosols, or in other vehicles. The relative proportions of the synergistic components can vary widely depending upon the insect pest to be controlled; however, from 0.5 to 20 parts of a synergistic compound as noted above to 1 part of carbamate is generally satisfactory. The compositions can contain from about 0.05% to 75% of the synergistic components in the emulsions, dry or wettable powders, solutions to be applied as aerosols, or other vehicles.

A suitable aerosol formulation is obtained by admixing the following materials:

Active ingredient _____ mg__ 20
Piperonyl butoxide _____ mg__ 100
Acetone _____ ml__ 20
Deodorized kerosene _____ ml__ 80

The active ingredient and piperonyl butoxide are dissolved in the acetone; the resulting solution is then thoroughly mixed with the deodorized kerosene. This mixture is placed in an aerosol bomb pressurized with nitrogen, to provide a spray containing about 250 p.p.m. of active ingredient after evaporation of the acetone. This formulation is very convenient for home use, for example, in destroying houseflies, mosquitoes, etc.

The novel compounds described herein are versatile insecticidal agents which can be employed for many purposes, e.g., in agriculture, in industry, in the home, etc. In addition, they are useful in pharmaceutical art as drugs, intermediates, and chemotherapeutics. The compounds are local anesthetics and exhibit anticholinesterase activity.

I claim:

1. A compound having the following structural formula:

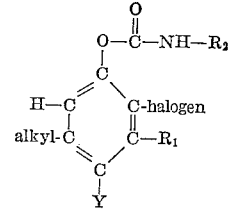

wherein Y is selected from the group consisting of halogen and alkyl of from 1 to 4 carbon atoms, inclusive; "alkyl" is of from 1 to 4 carbon atoms, inclusive; $R_1$ is selected from the group consisting of hydrogen and alkyl of from 1 to 4 carbon atoms, inclusive; and $R_2$ is selected from the group consisting of methyl and ethyl.

2. 2-halo-4,5-dialkylphenyl methylcarbamate according to claim 1.

3. 2-chloro-4,5-dimethylphenyl methylcarbamate.

4. 2-chloro-4,5-dimethylphenyl ethylcarbamate.

5. 2,4-dihalo-3,5-dialkylphenyl methylcarbamate according to claim 1.

6. 2,4-dichloro-3-methyl-5-ethylphenyl methylcarbamate.

7. 2,4-dichloro-3,5-dimethylphenyl methylcarbamate.

8. 2,4-dichloro-3-ethyl-5-methylphenyl methylcarbamate.

9. 2,4-dihalo-3,5-dialkylphenyl ethylcarbamate according to claim 1.

10. 2,4-dichloro-3-methyl-5-ethylphenyl ethylcarbamate.

11. 2,4-dichloro-3,5-dimethylphenyl ethylcarbamate.

12. 2,4-dihalo-5-alkylphenyl methylcarbamate according to claim 1.

13. 2,4-dichloro-5-methylphenyl methylcarbamate.

References Cited in the file of this patent

UNITED STATES PATENTS

| | | |
|---|---|---|
| 2,776,197 | Gysin et al. | Jan. 1, 1957 |
| 2,812,247 | Gysin et al. | Nov. 5, 1957 |
| 2,813,819 | Birum | Nov. 19, 1957 |
| 2,824,824 | Goodhue et al. | Feb. 25, 1958 |
| 2,933,383 | Lambrech | Apr. 19, 1960 |

FOREIGN PATENTS

| | | |
|---|---|---|
| 753,766 | Great Britain | Aug. 1, 1956 |